United States Patent [19]

Schott

[11] Patent Number: 4,732,773

[45] Date of Patent: Mar. 22, 1988

[54] INSTANT BEVERAGE AND INSTANT TEA

[75] Inventor: Gerhard Schott, Mettmann, Fed. Rep. of Germany

[73] Assignee: Krüger GmbH & Co. KG, Bergisch Gladbach, Fed. Rep. of Germany

[21] Appl. No.: 512,662

[22] Filed: Jul. 11, 1983

[30] Foreign Application Priority Data

| Jul. 17, 1982 | [DE] | Fed. Rep. of Germany | 3226765 |
| Oct. 7, 1982 | [DE] | Fed. Rep. of Germany | 3237077 |
| Feb. 4, 1983 | [DE] | Fed. Rep. of Germany | 3303709 |

[51] Int. Cl.$^4$ ............ A23F 3/30; A23J 1/10; A23L 2/00; A23L 2/02
[52] U.S. Cl. .................. 426/590; 426/597; 426/599; 426/657
[58] Field of Search ........... 426/590, 597, 599, 102, 426/548, 657, 285, 471

[56] References Cited

U.S. PATENT DOCUMENTS

| 3,741,771 | 6/1973 | Pour-El et al. | 426/599 |
| 3,770,452 | 11/1973 | Finley | 426/590 |
| 3,862,342 | 1/1975 | Maraulja et al. | 426/599 |
| 3,904,771 | 9/1975 | Donnelly et al. | 426/590 |
| 3,970,520 | 7/1976 | Feldman et al. | 426/32 |
| 3,988,511 | 10/1976 | Schapiro | 426/580 |
| 4,130,555 | 12/1978 | Ohtsuka et al. | 426/590 |
| 4,167,587 | 9/1979 | Danforth | 426/590 |
| 4,209,545 | 6/1980 | Schapiro | 426/285 |
| 4,309,417 | 6/1982 | Staples | 426/590 |
| 4,418,084 | 11/1983 | Murray et al. | 426/590 |

FOREIGN PATENT DOCUMENTS

| 0019675 | 12/1980 | European Pat. Off. | 426/592 |
| 1464571 | 2/1977 | United Kingdom | 426/548 |
| 2067573 | 7/1981 | United Kingdom | 426/657 |

Primary Examiner—Elizabeth Weimar
Attorney, Agent, or Firm—Wegner & Bretschneider

[57] ABSTRACT

Instant beverage, instant tea, instant tea beverage, instant fruit tea, and instant fruit tea beverage in the form of a powder, granules or paste which contain cocoa powder or powdery edible acids and/or vitamins, vegetable extracts and/or vegetable powders and/or fuit extracts and/or fruit powders, and optionally flavoring and/or aromatizing agents, and a carrier are prepared by using a protein as a carrier which protein is dispersible and/or soluble in a liquid. The content of vegetable extract and/or vegetable powder and/or fruit extract and/or fruit powder can be significantly increased. The new products are not cariogenic.

5 Claims, No Drawings

INSTANT BEVERAGE AND INSTANT TEA

Instant teas are generally prepared from dried vegetable extracts, various flavoring and/or aroma agents, and a readily water-soluble carrier. Saccharose and dextrose have predominantly been used as the carriers. Instant teas have been prepared by spray-drying the components, except for the carrier, either individually or together, mixing the components with the carrier, and granulating the mixture if desired. Particularly sensitive vegetable extracts have in part also been obtained by freeze drying. Because of the relatively high cost of lyophilization, spray-dried preparations to which flavoring or aroma agents could be subsequently added are often used. Instant teas based on saccharose and/or dextrose generally contain from 1 to 6%, and preferably about 2%, of vegetable extract. The bulk of such an instant tea, 94 to 99% by weight, is mainly the carrier.

Instant teas based on saccharose and/or dextrose have the drawback that when frequently used, particularly by babies and infants, a high occurrence of caries is observed due to the sugar present. Maltodextrin has replaced sugar as the carrier in some products. However, maltodextrin also has cariogenic properties similar to those of saccharose and dextrose.

It is an object of the present invention to develop an instant tea which does not have the disadvantage of being cariogenic and, therefore, may also be acceptable for use with babies and infants, while the storage quality, dosability and handling properties of conventional instant teas are retained.

The essential component of various teas is an extract or powder of vegetable origin (that term being used in its broadest sense), the leaves, roots, barks, petals, but also the fruits being used. The term "Tea" is inclusive of a number of vegetable extracts and powders, which can be classified into four subgroups: Tea, Tea Beverage, Fruit Tea, and Fruit Tea Beverage. The present invention relates to all of these four groups.

Thus, instant teas, in the broadest meaning of the term, include instant tea, instant tea beverage, instant fruit tea, and instant fruit tea beverage. Instant means that said teas are in the form of powder, granules or paste capable of being rapidly dispersed and/or dissolved upon contact with a liquid so that a ready-to-drink composition is easily and rapidly obtained. Thus, instant teas do not comprise the ready-to-drink compositions including a liquid but only their powdery, granular or paste-like precursors.

The instant tea, instant tea beverages, instant fruit tea, and instant fruit tea beverages according to the invention do also not comprise the pure vegetable extracts, vegetable powders, fruit extracts or fruit powders without carriers. The pure extracts are difficult to instantize, are generally very hygroscopic and difficult to handle. Such extracts instantized without a carrier are so hygroscopic that they solidify to a hard mass after only a short exposure to the moisture of the air. The resultant hard mass is difficult to measure, has a high bulk density and is only slowly soluble in water. Another disadvantage of vegetable extract instantized without a carrier is that it loses its aroma to a considerable extent and also some of its flavor. The subsequent addition of liquid flavoring and/or aroma agents is also extremely difficult when the extract instantized is without a carrier.

It has now been found that instant tea, instant tea beverage, instant fruit tea, and instant fruit tea beverage in the form of a powder, granules or also a paste which contain a vegetable extract and/or vegetable powder and/or fruit extract and/or fruit powder, and optionally flavoring and/or aroma agents, are obtained by using a protein which is dispersible and/or soluble in a liquid as the carrier. Thus, the instant tea, instant tea beverages, instant fruit tea, and instant fruit tea beverage according to the invention are characterized in that the carrier is a protein which is dispersible and/or soluble in a liquid; water-soluble proteins are particularly suitable. More specifically, proteins from the connective tissue which are soluble in water to give a clear solution and have a short chain have proven to be suitable.

It has also been found, according to this principle, that there may be prepared instant beverages in the form of a powder, granules or a paste which contain cocoa powder or powdery edible acids and/or vitamins. Thus another object of the present invention is to provide an instant beverage and a process for preparing same.

The liquid most often used for dispersing and/or dissolving the various products according to the invention is water. However, milk, fruit and vegetable juices, alcoholic beverages and other such water containing beverages can also be used.

In contrast to the instant teas based on saccharose and/or dextrose which generally contain 1 to 6%, and preferably 2%, of vegetable extract, the instant tea, instant tea beverage, instant fruit tea, and instant fruit tea beverage according to the invention preferably contain 10 to 50% by weight of vegetable extract and/or vegetable powder and/or fruit extract and/or fruit powder and, thus, preferably only 50 to 90% by weight of protein as the carrier.

Surprisingly, it is possible by the use according to the present invention of protein as the carrier to instantize a larger amount of cocoa powder, vegetable extract and/or vegetable powder and/or fruit extract and/or fruit powder and nevertheless to obtain products which with respect to the storage quality, dosability and handling properties thereof are comparable or even superior to conventional instant beverages and instant teas based on saccharose and/or dextrose. This effect in part resides in that the bulk densities of the products according to the invention are substantially lower than those obtained with the use of saccharose and/or dextrose as the carrier. The conventional instant teas generally have a bulk density of 0.4 to 0.8 g/ml, and the products according to the present invention have bulk densities of 0.1 to 0.5 g/ml, and prefereably of about 0.2 g/ml. Furthermore, the products according to the invention are substantially less hygroscopic than vegetable extracts instantized without a carrier. Thus, the lower bulk densities thereof are retained even for an extended period of time in the presence of the moisture of the air. Therefore, they will remain in a condition such as to be easily measured, easily handled, and readily dispersible.

If the final instant tea, instant tea beverage, instant fruit tea, and instant fruit tea beverage preparation may be opaque, a finely ground vegetable powder or fruit powder may be used in place of the vegetable or fruit extracts. Unless the opaqueness of the final preparation is considered undesirable, a protein being readily dispersible in the liquid may be used as the protein. If, however, clear preparations are required, then a vegetable extract or fruit extract as well as a protein which is soluble in the liquid would have to be used. A protein from the connective tissue which is soluble in water to give a clear solution and has a short chain has proven to be particularly suitable. To obtain a clearly soluble instant tea, instant tea beverage, instant fruit tea, and instant fruit tea beverage, a milk protein free from fat and carbohydrates and only weakly gelling gelatin derivatives may be employed as the protein. Milk powder as such while it contains about ⅓ of dispersible and/or soluble protein, is not suitable as a carrier according to the present invention because of its high fat and carbohydrates contents. Water-soluble proteins from wheat, corn and soybean may also be employed.

The instant tea, instant tea beverage, instant fruit tea, and instant fruit tea beverage according to the present invention may optionally contain flavoring and/or aroma agents. The flavoring agents include, inter alia, the carbohydrate-free sweeteners such as saccharin, cyclamate, aspartame, and the sugar-surrogates such as xylitol, sorbitol and mannitol.

As the aroma agents, basically any of the known natural and synthetical aroma agents approved for use in foods can be utilized. Since aroma agents are somewhat volatile and tend to be lost totally or partially during the instantizing procedure, they are mostly added afterwards.

The process according to the invention is a process for preparing instant beverages, instant tea, instant tea beverage, instant fruit tea, and instant fruit tea beverage in the form of a powder or granules which contain cocoa powder or powdery edible acids and/or vitamins, vegetable extracts and/or vegetable powders and/or fruit extracts and/or fruit powders and optionally flavoring and/or aroma agents on a carrier, which process is characterized in that either (a) cocoa powder or powdery edible acids and/or vitamins, the vegetable extract and/or the vegetable powder and/or the fruit extract and/or the fruit powder and optionally the flavoring and/or aroma agents and a dispersible and/or soluble protein are mixed in the dry state, or (b) cocoa powder or powdery edible acids and/or vitamins, the vegetable extract and/or the vegetable powder and/or the fruit extract and/or the fruit powder are dispersed and/or dissolved together with a protein, mixed and dried together, and the products thus obtained are optionally granulated, pressed and/or agglomerated, and optionally flavoring and/or aroma agents are added thereto.

In some cases, it is possible to eliminate the complete drying step to obtain rapidly dispersible and/or soluble pastes. Said pastes may preferably be filled into collapsible tubes, and are storable, readily measurable and easy to handle and may, thus, also be considered as instant beverages, instant tea, instant tea beverage, instant fruit tea, and instant fruit tea beverage.

It is one common feature of all of the products according to the invention that they can be prepared substantially without an addition of cariogenic carbohydrates and are low in calories as compared to conventional instant beverages and instant teas. This is particularly important in baby and infant nutrition where inhibition of caries is very important. However, the instant beverages, instant tea, instant tea beverage, instant fruit tea, and instant fruit tea beverage according to the invention may be used for all types of drinkable preparations. In so far as the products are dispersible and/or soluble in aqueous alcohol, they may also be used for quickly and simply preparing alcoholic mixed drinks.

Clearly soluble preparations are preferred for the products of baby and infant nutrition. Therefor, proteins obtained from connective tissue and having short chains have proven to be particularly suitable as the carriers. They are prepared, for example, by a partial enzymatic degradation of fresh connective tissue on a commercial scale so that short-chain proteins having molecular weights in the range from 2,000 to 10,000 are obtained. These products are neutral in flavor, heat-stable up to maximum 150° C., sterilizable under the conditions of pasteurization, and preparable with a low germ content below the germ number admissible for dietary food. They are storable under dry conditions for years and water-soluble to at least 90%. Moreover, while easily wetted, they are not hygroscopic, and do not tend to agglomerate. Such short-chain proteins, for example, have been offered by the B.P.F. Biologisch-Physikalische Forschungsgesellschaft mbH, Frankfurt, Federal Republic of Germany) under the name of KK-Protein "F" and by the firm Milei (Schwäbisch-Gmünd, Federal Republic of Germany).

Commercially available cocoa powders, to which cocoa aroma may be subsequently added if desired, can be used as the cocoa powder according to the invention. Citric acid, tartaric acid, and malic acid are especially used as the powdery edible acids. Ascorbic acid, some or all of the B complex vitamins and the usual mixtures of various vitamins may be used as the vitamins.

More specifically, when the vitamines are spray-dried together with a solution of the protein, stability is increased. Similar observations have been made with flavoring and aromatizing agents, which according to the invention are stabilized against decomposition and deterioration after the protein has been dried.

As the soluble vegetable extracts and fruit extracts, basically all of the extracts may be used which have already been processed to give instant teas according to prior art. Said extracts mostly are spray-dried aqueous extracts. In so far as a sufficient solubility is ensured, dried alcoholic extracts may also be employed or added. Said extracts may either be dried in a dissolved or dispersed state together with the protein. However it is preferred that they are mixed with the carrier in the dry condition. Products that are particularly easy to handle by the consumer are obtained by subsequently granulating or pressing said mixtures, while flavoring and/or aromatizing substances may optionally be added in said process step. Products having a particular aroma stability are obtained by incorporating the aroma ingredients in a microencapsulated state in the final product. In addition to employing the conventional steps for granulating, pressing, or agglomerating, the final product may also be processed by the so-called Pillsbury process such as to give a flocculent material. In all cases products having low bulk densities are obtained that are stable, easy to handle and easy to be measured.

Typical products and the processes for preparing same according to the invention are illustrated in detail by way of the following examples.

EXAMPLE 1

80 parts by weight of a short-chain protein (KK-Protein "F", produced from the B.P.F., Biologisch-Physikalische Forschungsgesellschaft mbH, Frankfurt, Federal Republic of Germany) was thoroughly mixed with 20 parts by weight of spray-dried fennel extract (Extractum Foeniculi aquos sicc.) and the mixture was granulated in a fluid bed granulator with the addition of water. 1.8% by weight of fennel oil in a microencapsulated state was added to the granules and thoroughly admixed. 1 g of the final granules with 100 ml water gave a fennel tea of good quality.

The composition of the short-chain protein was as follows:

Protein (N×6.25): 94.4%
Nitrogen: 15.1%
Ash: 1.26%
Fat: 0.091%
Water: 4.2%
Bulk density: 380 g/l±30 g/l
Molecular weight: 2,000
pH Value, 5% solution (±0.2%): 5.6
Water solubility, 10 g/l, room temperature, 10 h: 99.945%
Viscosity, 10% solution: 2.0 cP
Chloride: not detectable
Phosphate: not detectable
Potassium: not detectable
Sodium: 433 mg/100 g
Calcium: 79 mg/100 g
Magnesium: 8 mg/100 g
Total germ number: max. 3.000/g
*E. coli:* negative/0.1 g
Coliform: max. 10/g
*Staphylococcus aureus:* negative/11 g
Salmonella: negative/25 g
Bacteria inhibitors (DAB 7): not detectable
Free nitrogen compounds, (ammonia odur volatile amines): not detectable

| Essential Amino Acids (AA) | % by weight |
|---|---|
| Isoleucine | 1.49 |
| Leucine | 3.07 |
| Lysine | 3.89 |
| Methionine | 1.08 |
| Phenylalanine | 1.87 |
| Threonine | 1.80 |
| Tryptophane | 1.09 |
| Valine | 2.64 |
| Histidine | 1.27 |
| Arginine | 6.83 |

EXAMPLE 2

40% by weight of fennel extract and 56.4% by weight of short-chain protein were mixed as in example 1, and 3.6% by weight of microencapsulated fennel oil were added thereto. The product thus obtained was also still quickly soluble. 0.5 g of said product were already sufficient for the preparation of 100 ml fennel tea.

EXAMPLE 3

44.9% by weight of short-chain protein (KK-Protein "F", produced from the B.P.F., Biologisch-Physikalische Forschungsgesellschaft mbH, Frankfurt, Federal Republic of Germany) were dissolved in 100 parts by weight of water. 30% by weight of citric acid, 20% by weight of natural orange aroma, 4.4% by weight of β-carotene and 0.7% of saccharin were added to the mixture. The mixture was spray-dried and granulated. 1 g of the obtained granules with 100 ml of water provided a good-tasting refreshing beverage containing no sugar.

EXAMPLE 4

To an aqueous solution containing 57.32 parts by weight of short-chain protein there were added in the same manner as in example 1, 40 parts by weight of cocoa powder, 1.68 parts by weight of sweetener and 1.0 part by weight of a mixture of sodium chloride, vanillin and cocoa aroma, and the obtained mixture was spray-dried and granulated. 5 g of these granules in 100 ml of milk quickly yield a cocoa beverage containing no sugar.

EXAMPLE 5

An aqueous solution of 82.72 parts by weight of short-chain protein was mixed with 17.28 parts by weight of a commercially available vitamin composition (6 parts by weight of the vitamin B complex; 75 parts by weights of vitamin C; 12 parts by weight of vitamin E; 0.05 parts by weight of biotin; 15 parts by weight of nicotinic acid amide; 10 parts by weight of calcium D-pantothenate), and the mixture was spray-dried and granulated. 1 g of the granules are quickly dissolved in 100 ml liquid and will satisfy the daily vitamin need of an adult person.

EXAMPLE 6

94.7 kg of short-chain protein (KK protein "F") were dissolved in water together with 5.22 kg of a vegetable extract mixture for bladder and kidney tea. The mixture was spray-dried. 36.9 g of ethereal oils and flavoring agents were added thereto, and then the mixture was granulated. 100 g of the instant tea having been thus obtained contained the following active portions:

Extr. Fol. Betulae aquos sicc.: 510.0 mg (8:1)
Extr. Flor. Calendulae aquos sicc.: 235.0 mg (10:1)
Extr. Herb. Equiseti aquos sicc.: 470.0 mg (7:1)
Extr. Fruct. Foeniculi aquos sicc.: 210.0 mg (7:1)
Extr. Rhiz. Graminis aquos sicc.: 470.0 mg (7:1)
Extr. Fruct. Juniperi aquos sicc.: 515.0 mg (3:1)
Extr. Rad. Liquiritiae aquos sicc.: 470.0 mg (10:1)
Extr. Rad. Ononidis aquos sicc.: 425.0 mg (8:1)
Extr. Fol. *Orthosiphonis staminei* aquos sicc.: 375.0 mg (6:1)
Extr. Fruct. Phaseoli sine Semine aquos sicc.: 425.0 mg (8:1)
Extr. Herb. Virgaureae aquos sicc.: 510.0 mg (7:1)
Extr. Fol. *Uvae ursi* aquos sicc.: 605.0 mg (6:1)

The ratio numbers in parantheses denote the concentration ratios of the respective extracts, i.e. a partial extract was prepared from the amount of drug as indicated in the first place.

8.5 parts by weight of said instant tea are readily dissolved in and provide a bladder and kidney tea which conforms to an commercially available product that has not been instantized.

EXAMPLE 7

79.86 kg of the clearly soluble short-chain protein according to example 6 were dissolved in water together with 20 kg vegetable extract for bladder and kidney tea according to example 6, and the mixture was spray-dried. 0.14 kg of ethereal oils and flavoring agents were added thereto, and the mixture was granulated. 2.2 g of the tea having been thus obtained were dissolved in 100 ml of water and yielded a tea corresponding to that of example 6.

EXAMPLE 8

89.5 kg of short-chain protein, 10.0 kg Extr. *Sennae e fol. sicc.* and 0.5 kg of ethereal oils and flavoring agents were processed in an analogous way to that example 6 to give an instant tea which after being dissolved in water will be a laxative tea.

EXAMPLE 9

79.0 kg of clearly soluble protein, 6 kg of Extr. Ginseng sicc. e radicis 5:1 and 15.0 kg of Extr. *Thea nigrae* were processed as in example 6 to give an instant tea which may be dissolved and yield a Ginseng tea with black tea.

What is claimed is:

1. An instant beverage substantially free of cariogenic carbohydrates, said beverage forming a clear solution in aqueous media and being in the form of a powder, granules or paste comprising a vegetable or fruit extract and 44.9–94.7% by weight of a protein carrier, the carrier being soluble in an aqueous medium and consisting essentially of a short chain protein having a molecular weight in the range of 2,000 to 10,000 which is obtained from connective tissue.

2. An instant beverage according to claim 1 additionally containing one or more ingredients selected from the group consisting of cocoa powder, powdery edible acids, vitamins, vegetable extracts, vegetable powders, fruit extracts, fruit powders, flavoring agents and aromatizing agents.

3. An instant beverage according to claim 1 wherein the beverage is a tea, fruit tea or tea-containing beverage.

4. An instant beverage according to claim 3 additionally containing one or more ingredients selected from the group consisting of cocoa powder, powdery edible acids, vitamins, vegetable extracts, vegetable powders, fruit extracts, fruit powders, flavoring agents and aromatizing agents.

5. An instant beverage according to claim 1 containing from 50 to 90% by weight of the carrier.

* * * * *